E. H. DAVIES.

Improvement in Apparatus for Coating with Tin and other Metals.

No. 128,862.  Patented July 9, 1872.

Witnesses:
Franck L. Durand
C. L. Evert

Inventor.
Evan H. Davies,
per Alexander Mason
Attorneys.

UNITED STATES PATENT OFFICE.

EVAN H. DAVIES, OF PITTSBURG, PENNSYLVANIA.

IMPROVEMENT IN APPARATUS FOR COATING WITH TIN AND OTHER METALS.

Specification forming part of Letters Patent No. 128,862, dated July 9, 1872.

*To all whom it may concern:*

Be it known that I, EVAN H. DAVIES, of the city of Pittsburg, in the county of Allegheny and in the State of Pennsylvania, have invented certain new and useful Improvements in Apparatus for Coating with Tin or other Metals; and do hereby declare that the following is a full, clear, and exact description thereof, reference being had to the accompanying drawing and to the letters of reference marked thereon making a part of this specification.

The nature of my invention consists in the construction and arrangement of an "apparatus for coating with tin and other metals," as will be hereinafter more fully set forth.

In order to enable others skilled in the art to which my invention appertains to make and use the same, I will now proceed to describe its construction and operation, referring to the annexed drawing, in which—

Figure 1:
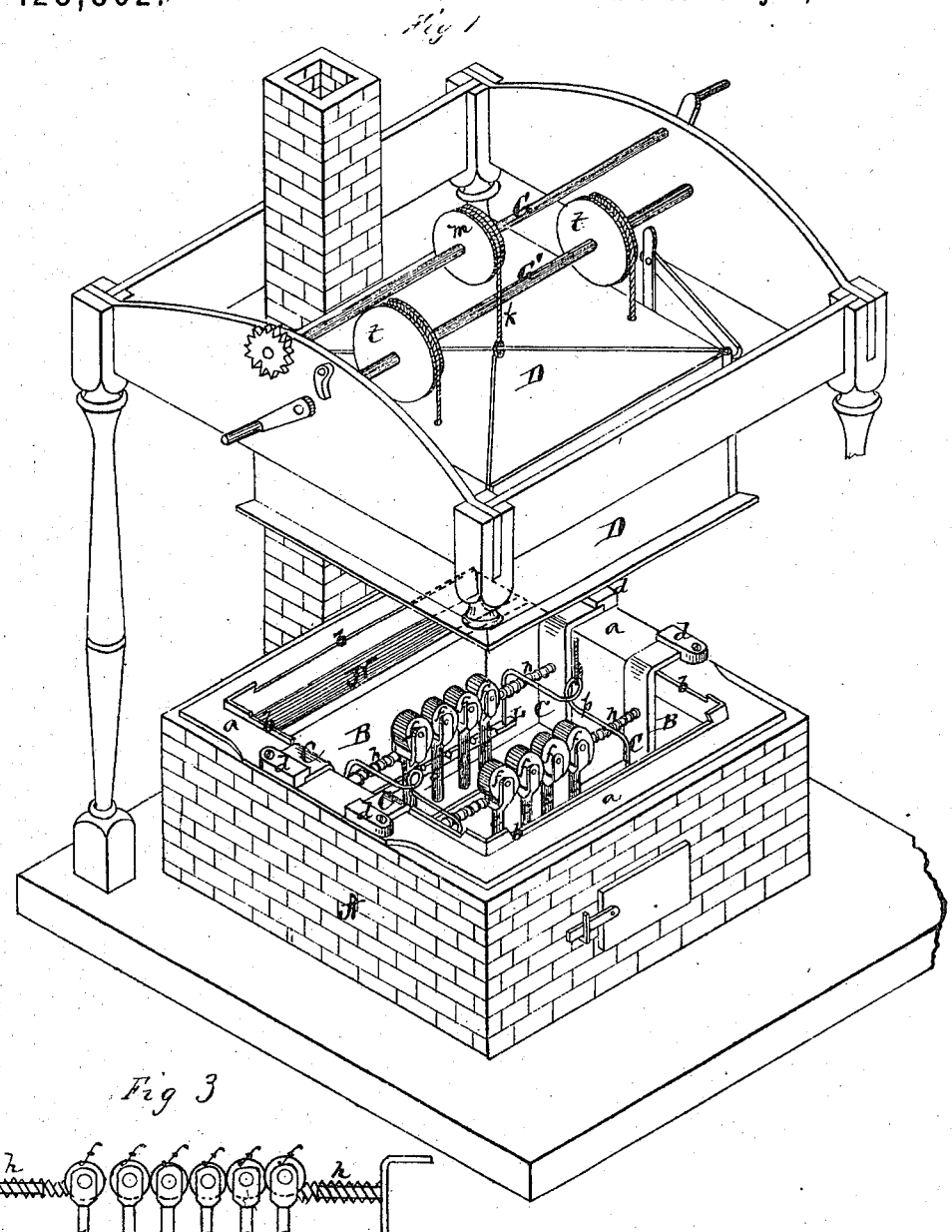
Figure 2:
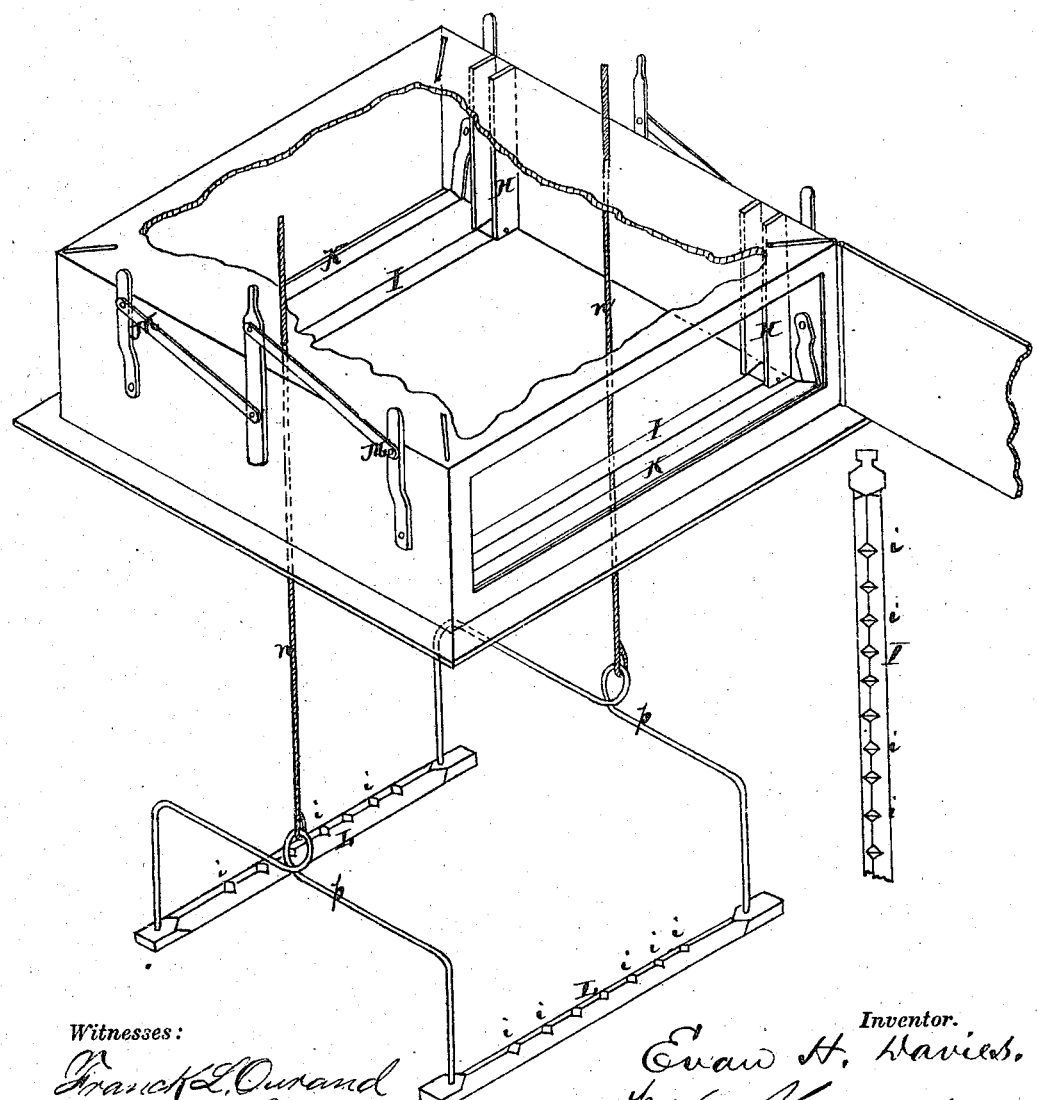

Figure 1 is a perspective view of my entire apparatus. Fig. 2 is a perspective view of the cover or temperator partly broken open to show the interior arrangement; and Fig. 3 is an enlarged side view of the frame within the melting-pot.

A represents the brick-work of my apparatus, constructed in any suitable manner with a furnace and flues extending under and around the pot B, placed within said brick-work. This pot is made of iron, with a flange, $a$, around its top to support it upon the brick-work. The inner edge of the pot is raised, as shown at $b$, which rise acts as a guide to bring the lid or temperator to its proper place when lowered down. Inside the pot B is a frame, C, secured in its position by buttons $d\ d$ or equivalent devices on the side of the flange $b$ of the pot. This frame has a number of upright rods, $e\ e$, fastened in it, which carry two rows of small rollers, $f\ f$. Any desired number of such rollers may be used, as occasion may require. They are held together by means of springs $h\ h$ pressing from the outer rods of each series against the sides of the pot. The temperator or cover D is made of sheet-metal, one side forming a door, E, as shown in Fig. 2. The temperator is suspended by a chain, $k$, passing over a pulley, $m$, upon a shaft, G, above. Inside of the temperator are four vertical guides, H H, in which slide two bars, I I, called guides, which extend across parallel with the lines of rollers in the pot on each side. Also inside are two other bars, K K, called holders, which, by the system of levers M M outside, to which they are attached, operate forward and backward. In the pot are two other bars, L L, one on each side of the lines of rollers, and directly beneath the guide-bars I I, hanging in the temperator. The bars L L are joined by a straddle, $p$, at each end, rising above the springs $h\ h$ in the pot, and by which said bars are suspended by chains $n\ n$ passing through the top of the temperator and over two pulleys, $t\ t$, upon a shaft, G', by means of which they are raised and lowered.

The working of the machine is as follows: The pot B being full of melted metal above the tops of the lines of rollers $f\ f$, which are in their places, the lifter-bars L L are lowered to the bottom of the pot. The article to be coated, having been previously prepared, is thrust into the molten metal, passing between two of the rollers, and on down until it rests in notches $i\ i$ in the lifters L L, corresponding with the rollers. This is continued until all the spaces between the rollers are full. The scum of the surface is scraped into a trough, N, formed in one side of the pot after the objects to be coated are all in the bath. The temperator D is then let down, and is compelled to find its proper place by the raised edge $b$ on the pot. Everthing being brought to its place, and the holder-bars K pushed against the sides of the temperator, a proper time is allowed to elapse, and the air in the temperator has arrived at the same or nearly the same temperature as the molten metal below. Then the lifter-bars L, by means of the shaft and pulleys to which they are connected, are raised, and elevate the objects in the bath with them. As they pass up out of the bath they fall into corresponding notches in the guide-bars I, and elevate the said bars also. When they have reached the proper height in the temperator the motion is stopped, and the holder-bars are, by means of the levers, thrust inward until they pass under the edges of the objects. The temperator is then raised by means of the shaft and pulley, and the holders K take the objects from the lifters L, the latter hanging free, and the whole is raised up higher to cool. The lifter is then lowered into the bath, which is then ready for another charge. After the objects hanging in the temperator have cooled sufficiently, a suitable plate is held underneath, the holders K are thrown back, and the objects drop upon the plate and are removed, and the temperator is again ready for use. The door on the side of the temperator is for examining and other purposes while in operation.

The usual process of coating with tin is as follows: The sheet is first tinned; then it is redipped, called washing; then taken from there to a pot of boiling grease, and kept therein until the superfluous material is taken off; then to another pot of melted tin to dip the lower edge in order to remove the thick metal that had settled on it, called listing; then it is rubbed clean with bran; again rubbed with sharps, a finer kind of bran; then with flour; and at last dusted.

In my process all this labor and waste of material are done away with. The temperator D is for the purpose of regulating the temper of the atmosphere around the sheets when coming out of the metal. By drawing the sheets in a certain degree of temperature or heat it produces a superior coating and a beautiful color, the air being much cleaner and clearer than the grease of the old process. By drawing the plates slowly, by my process, a very thin coating can be obtained, and should a thick coating be desired it is only necessary to draw them quickly, so that by this apparatus any desired thickness of coating can be obtained by a skilled workman, and the sheets, when they leave the temperator, are at once ready for the market.

The springs $h\ h$ at the ends of each series of rollers are for the purpose of preventing the sheets from rising when coating with lead. This they do by binding the rollers upon the sheets, the rollers also keeping the sheets in their proper positions to meet the notches in the lifter-bars.

Having thus fully described my invention, what I claim as new, and desire to secure by Letters Patent, is—

1. Immersing the object to be coated into a bath of melted metal, withdrawing the object therefrom into a bath of air heated to about the same temperature as the melted metal, and then cooling the same, for the purposes set forth.

2. Two or more series of pins, $e$, carrying rollers $f$ at their upper ends, and with a spring, $h$, at each end of each series, all arranged within the pot B, substantially as and for the purposes herein set forth.

3. The removable frame C, carrying the pins $e$, rollers $f$, and springs $h$, and held in the pot B by buttons $d$ or other suitable means, substantially as and for the purposes herein set forth.

4. The notched lifter-bars L, connected by the straddles $p$, and operated by means of the chains $n$, pulleys $t$, and shaft G' or their equivalents, in combination with the temperator D, all substantially as and for the purposes herein set forth.

5. The holder-bars K, operated within the temperator D by means of a suitable system of levers, substantially in the manner and for the purposes herein set forth.

6. The notched guide-bars I, moving in guides H on the inside of the temperator D, substantially as and for the purposes herein set forth.

7. The temperator D, constructed as described, to fit around the raised edge $b$ of the pot B, substantially as and for the purposes herein set forth.

In testimony that I claim the foregoing I have hereunto set my hand this 18th day of April, 1872.

EVAN H. DAVIES.

Witnesses:
ISAAC L. MORRIS,
GRIFFITH DAVIES.